US008813057B2

(12) United States Patent
Quiñones et al.

(10) Patent No.: US 8,813,057 B2
(45) Date of Patent: Aug. 19, 2014

(54) BRANCH PRUNING IN ARCHITECTURES WITH SPECULATION SUPPORT

(75) Inventors: Carlos García Quiñones, Barcelona (ES); Jesus Sanchez, Barcelona (ES); Carlos Madriles, Barcelona (ES); Pedro Marcuello, Barcelona (ES); Antonio Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 1356 days.

(21) Appl. No.: 11/695,006

(22) Filed: Mar. 31, 2007

(65) Prior Publication Data
US 2008/0244223 A1 Oct. 2, 2008

(51) Int. Cl.
*G06F 9/45* (2006.01)

(52) U.S. Cl.
USPC .............................. 717/159; 717/151; 712/234

(58) Field of Classification Search
USPC .............. 717/151, 106–119, 159; 712/23–26, 712/208–244; 711/3, 125
See application file for complete search history.

(56) References Cited

U.S. PATENT DOCUMENTS

| 5,202,995 | A | * | 4/1993 | O'Brien | 717/160 |
| 5,339,420 | A | * | 8/1994 | Hoxey | 717/151 |
| 5,396,631 | A | * | 3/1995 | Hayashi et al. | 717/159 |
| 5,442,790 | A | * | 8/1995 | Nosenchuck | 717/155 |
| 5,450,585 | A | * | 9/1995 | Johnson | 717/156 |
| 5,511,198 | A | * | 4/1996 | Hotta | 717/156 |
| 5,586,020 | A | * | 12/1996 | Isozaki | 717/159 |
| 5,850,553 | A | * | 12/1998 | Schlansker et al. | 717/155 |
| 5,901,318 | A | * | 5/1999 | Hsu | 717/161 |
| 5,966,537 | A | * | 10/1999 | Ravichandran | 717/158 |
| 5,978,905 | A | * | 11/1999 | Takayama et al. | 712/238 |
| 5,999,738 | A | * | 12/1999 | Schlansker et al. | 717/156 |
| 5,999,739 | A | * | 12/1999 | Soni et al. | 717/156 |
| 6,301,652 | B1 | * | 10/2001 | Prosser et al. | 712/204 |
| 6,415,356 | B1 | * | 7/2002 | Chaudhry et al. | 711/118 |
| 7,000,227 | B1 | * | 2/2006 | Henry | 717/152 |
| 7,185,330 | B1 | * | 2/2007 | Khu | 717/160 |
| 2003/0115579 | A1 | * | 6/2003 | Archambault et al. | 717/152 |
| 2004/0154010 | A1 | | 8/2004 | Marcuello et al. | |

OTHER PUBLICATIONS

Bodik, Rastislav, Rajiv Gupta, and Mary Lou Soffa. "Interprocedural conditional branch elimination." ACM SIGPLAN Notices 32.5 (1997), pp. 146-158.*

Manne, Srilatha, Artur Klauser, and Dirk Grunwald. "Pipeline gating: speculation control for energy reduction." ACM SIGARCH Computer Architecture News. vol. 26. No. 3. IEEE Computer Society, 1998, pp. 132-141.*

(Continued)

*Primary Examiner* — Satish Rampuria
(74) *Attorney, Agent, or Firm* — Barre Law Firm, PLLC

(57) ABSTRACT

According to one example embodiment of the inventive subject matter, the method and apparatus described herein is used to generate an optimized speculative version of a static piece of code. The portion of code is optimized in the sense that the number of instructions executed will be smaller. However, since the applied optimization is speculative, the optimized version can be incorrect and some mechanism to recover from that situation is required. Thus, the quality of the produced code will be measured by taking into account both the final length of the code as well as the frequency of misspeculation.

16 Claims, 3 Drawing Sheets

(56) References Cited

OTHER PUBLICATIONS

Du, Zhao-Hui, et al., "A cost-driven compilation framework for speculative parallelization of sequential programs", *Proceedings of the ACM SIGPLAN 2004 Conference on Programming Language Design and Implementation*, (Jun. 2004), 71-81.

Wang, H, et al., "Post-pass binary adaptation for software-based speculative precomputation", *Proceedings of the ACM SIGPLAN 2002 Conference on Programming Language Design and Implementation*, (2002), 117-128.

Zilles, Craig, et al., "Master/Slave Speculative Parallelization", *35th Annual IEEE/ACM Proceedings International Symposium on Microarchitecture, 2002. (MICRO-35). Proceedings.*, (2002), 85-96.

\* cited by examiner

BRANCH PRUNING IN ARCHITECTURES WITH SPECULATION SUPPORT

TECHNICAL FIELD

Various embodiments described herein relate to computer technology generally, including branch pruning in architectures with speculation support.

BACKGROUND

Modern pipelined microprocessors use speculative execution to reduce the cost of conditional branch instructions. When a conditional branch instruction is encountered, the processor guesses which way the branch is most likely to go (this is called branch prediction), and immediately starts executing instructions from that point. If the guess later proves to be incorrect, all computation past the branch point is discarded. The early execution is relatively cheap because the pipeline stages involved would otherwise lie dormant until the next instruction was known. However, wasted instructions consume Central Processing Unit (CPU) cycles that could have otherwise delivered performance, and on a laptop, those cycles consume battery power.

DETAILED DESCRIPTION

According to one example embodiment of the inventive subject matter, the method and apparatus described herein is used to generate an optimized speculative version of a static piece of code. The portion of code is optimized in the sense that the number of instructions executed will be smaller. However, since the applied optimization is speculative, the optimized version can be incorrect and some mechanism to recover from that situation is required. Thus, the quality of the produced code will be measured by taking into account both the final length of the code as well as the frequency of misspeculation.

The method and apparatus of inventive subject matter described herein belongs to a family generically known as branch pruning. It focuses on conditional branches that are strongly biased (i.e., they normally follow the same edge) and optimizes the code by eliminating the infrequently taken paths. The benefit of branch pruning is the removal of the instructions that, following data and control dependences, are needed to execute the branch or/and the instructions in the infrequent path. However, that optimization may also produce incorrect values when the pruned path is followed, requiring then a recovery mechanism. According to one example embodiment of the method and apparatus described herein accurately models the effect of each modification in terms of length and correctness of the resulting code, thus, making the selection of branches to prune a more informed decision.

Figure 1:
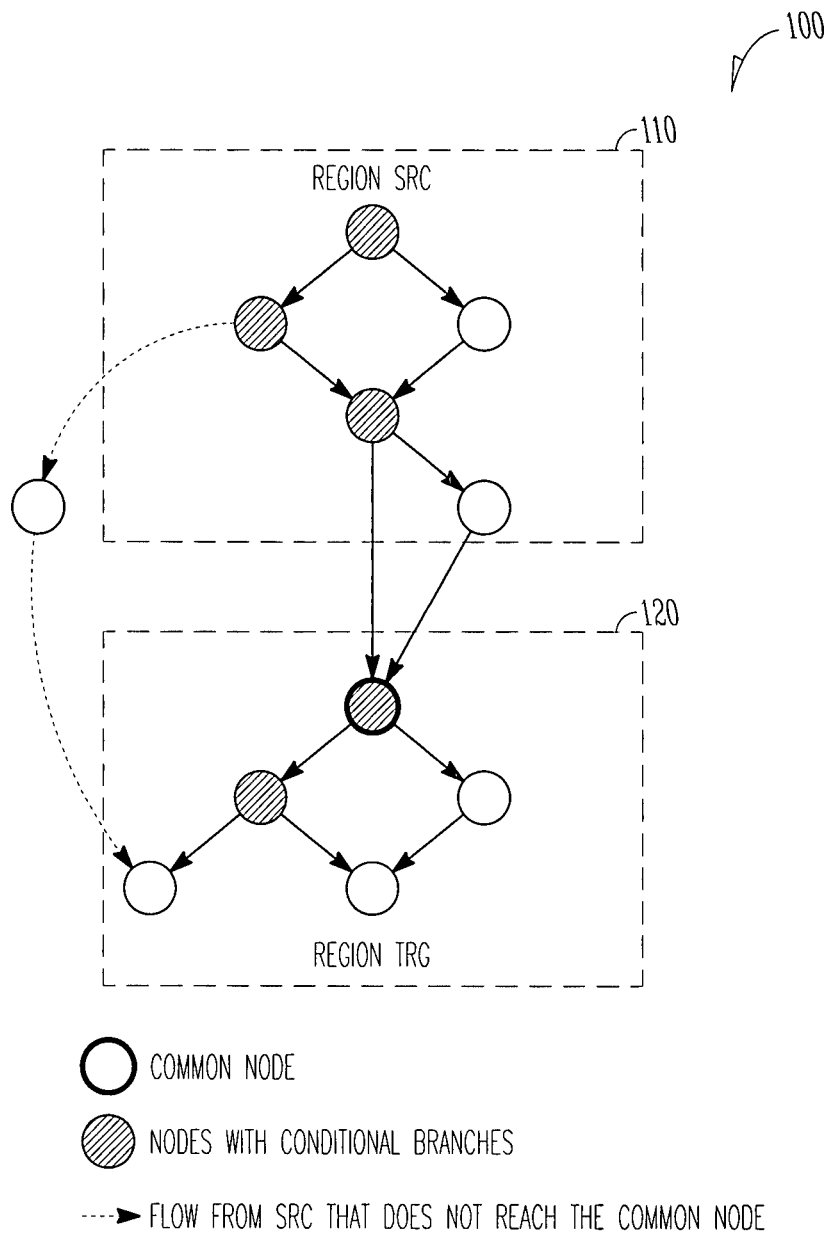
FIG. 1 is a block diagram of conditional branching according to various embodiments of the invention.

According to one example embodiment, there is provided an abstraction of the region to optimize. The kind of code that may be desirable to optimize will be given by two regions also referred to herein as Region SRC—source—and Region TRG—target) connected by a common node. The optimization is based on the assumption that the regions are sequential (one is executed right after the other though that common node). However, the possibility that the second region is not executed at all is also considered, depending on the control flow in the first one. A graphical example is illustrated in FIG. 1. The input of the algorithm is a control-flow graph (CFG) 100 that represents the static description of the two regions. This CFG can be obtained through a compiler, a binary optimizer, a virtual machine or any other tool. The CFG is made of a set of basic blocks, each one annotated with its possible flow successors as well as the probability to follow each edge. Each basic block consists of a list of instructions, each one annotated with data and control dependence information (i.e., what other instructions each one of its source operands depend on, and what control instructions are needed for being executed).

A conditional branch instruction has two or more potential successors (or edges in the CFG). According to one example embodiment, there are two possible optimizations to branch pruning:

1. Abort an edge: with that optimization the branch instruction is not modified at all. Instead, the benefit comes from removing in the optimized region those instructions that are reachable only when this edge is followed. However, the branch instruction (and its dependences) is not modified.
2. Prune an edge: with that optimization the conditional branch instruction is transformed into an unconditional branch. The additional benefit with respect to aborting the edge is that the dependences of the branch instruction can also be optimized.

In the control-flow graph 100 there is highlighted two nodes: a source node (SRC) and a target node (TRG) 120. The SRC node is the entry to the optimization code (Region SRC 110), whereas the TRG node, before named as the common node, is the entry to the next region (Region TRG 120). In general, the Region SRC 110 is supposed to compute values that will be needed by Region TRG 120 and/or any other region that can be executed after Region TRG 120.

An optimized version of the Region SRC 110 consists on a subset of the instruction in the original region with the exception of the branches that have been pruned, which are changed from conditional branches to unconditional. One objective of the optimization described herein is that this optimized version of the Region SRC 110 (Opt Region SRC) computes the values needed by the Region TRG 120. This means that the Opt Region SRC will ignore values needed for regions after Region TRG 120.

From the control-flow graph there can be extracted two data structures. As a first abstraction, the control-flow graph can be seen as a set of paths, where each path has the following information:

```
PATH ≡ PATH_RegSRC = LIST(BB), a list of basic blocks from SRC to TRG
       LEN_RegSRC, the length of the PATH_RegSRC, in number of instructions
       PATH_RegTRG = LIST(BB), a list of basic blocks from TRG to the end
       LEN_RegTRG, the length of the PATH_RegTRG, in number of instructions
       PROB_occur, probability of this path to occur( ∈ [0.00 – 1.00])
       PROB_misspec, probability of this path to misspeculate( ∈ [0.00 – 1.00])
       IS_abort, a boolean (0 or 1) indicating if this is an abortion path
```

An abortion is a path that starts at the SRC node but does not reach the TRG node. This may happen because of the intrinsic control flow, or because there is introduced an explicit abort action in the optimized version, as may be seen later.

Finally, each basic block is a list of instructions:

$$BB = \text{LIST(INS)}$$

Since the optimized version of the region is just a subset of the original instructions, an instruction (INS) is just a boolean that indicates whether the original instruction is included or not. Obviously, initially all instructions are marked as being included.

At the beginning of the process all paths have the $PROB_{misspec}$ to 0.00 (i.e., 0%). With that definition, there can be computed a set of variables for the Region SRC (optimized or not) that will be used in the algorithm:

Probability to abort: $PROB_{abort} = \sum_{\forall PATH} (IS_{abort} \times PROB_{occur})$ Probability to reach: $PROB_{reach} = (1 - PROB_{abort})$ Probability to correct: $PROB_{correct} =$
$$\sum_{\forall PATH} ((1 - IS_{abort}) \times (1 - PROB_{misspec}) \times PROB_{occur})$$

Length when reach: $LEN_{reach} =$
$$\sum_{\forall PATH} ((1 - IS_{abort} \times LEN_{RegSRC}) / PROB_{reach}$$

Length when abort: $LEN_{abort} = \sum_{\forall PATH} (IS_{abort} \times LEN_{RegSRC}) / PROB_{cancel}$ Total length: $LEN_{total} =$
$$\sum_{\forall PATH} ((1 - IS_{abort}) \times (LEN_{RegSRC} + LEN_{RegTRG})) / PROB_{reach}$$

The second abstraction that will be used if the set of branches in the CFG, where each branch is defined as:

```
BRANCH ≡ ID, a unique identifier of the branch instruction if the CFG (e.g., the IP)
         SET(EDGE). a set of edges to all possible successors
```

Thus, and edge will describe two things:

```
EDGE ≡ PROB_taken, probability to take this edge
       SET_reach(BB), a set of basic blocks that are reachable only if this edge is taken
```

Figure 2:
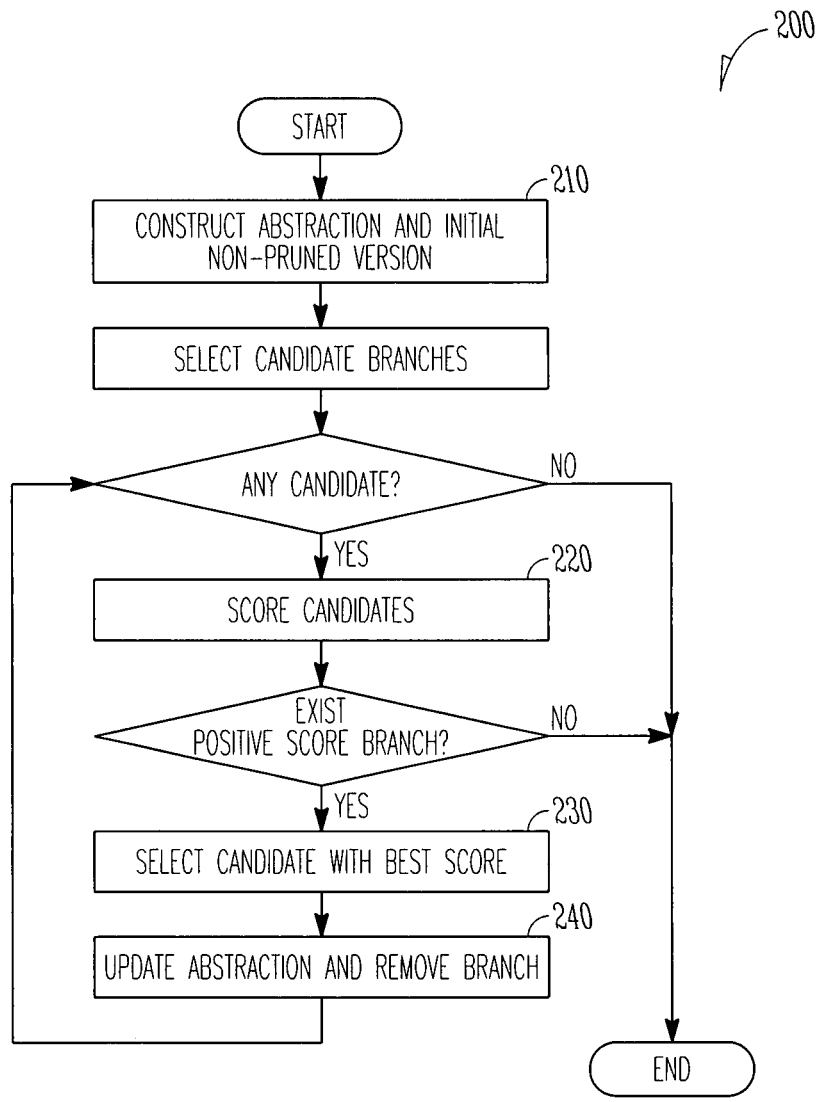
FIG. 2 is a flow diagram illustrating a method according to various embodiments of the invention.

The main parts of one example embodiment of an algorithm according to the inventive subject matter are shown in the flow chart 200 of FIG. 2. According to one example embodiment, the first non-pruned version of Opt Region SRC is built by using the data and control dependences among the instructions in the CFG 210. For that, there is first detected all the data dependences where the producer is in Region SRC and the consumer in Region TRG. These dependences are typically referred to as the live-ins of Region TRG. Second, and starting from these initial set of instructions, one may traverse upwards both the data and control dependences in Region SRC. All the instructions traversed are marked as to belong to the initial version of Region SRC.

With that first step the initial optimized version of Region SRC will contain all the instructions needed to correctly compute the live-ins of Region TRG. The rest will not be included in that initial version. This local optimization is equivalent to applying dead-code elimination.

At this point there has to be decided which instructions or groups of instructions are potentially beneficial to remove. To simplify the problem, for each edge, either all or none the instructions contained in it will be considered for removal. The edges that a-priori are beneficial to abort/prune are those that are most biased. The branch instructions that contain these edges (a bias threshold is used) are added to the set of candidates.

There will now be described the effect in the optimized region of aborting or pruning a branch edge. Then, there will be described the metric used to determine the benefit of the technique for each edge. The actions taken when an edge is aborted or pruned are different depending on whether the branch is in the Opt Region SRC or in the Region TRG. The latter region cannot be modified and then pruning an edge there only affects the paths that lead to this branch. Note that the only piece of code to optimize is Opt Region SRC, however the instructions included there depend on the control/data dependences with Region TRG (previously referred to as live-ins). Thus, pruning in the Region TRG actually means ignoring live-ins, but no abort is inserted nor instructions in Region TRG are removed.

In the case of a branch in the Region TRG, the data dependence chains are followed in the other direction (bottom-up). The producers of an ignored instruction are checked. If they are instructions that belong to the Opt Region SRC, all the paths containing both the producer and the consumer instruction are marked as incorrect (PROB$_{misspec}$=1.00).

The case of the Opt Region SRC is different. Here instructions can be removed or transformed. In the case of edge abortion, all paths containing that edge will set the IS$_{abort}$ variable to 1. An abort instruction is included at the target of the edge. In the case of edge pruning, more actions must be taken. The misspeculation effect depends on the effect of removing the branch in the Opt Region SRC:

In the case of pruning an edge in the Opt Region SRC, the dependences whose producers are instructions in the pruned branch are followed towards their consumers (top-down):

If the consumer of such dependences is an instruction in Region TRG then all the paths that contain both the producer and the consumer are marked as incorrect (PROB$_{misspec}$=1.00).

If the consumer is an instruction in Opt Region SRC then the dependence chain has to be followed (by recursively checking the consumers of the consumer) until a live-in in Region TRG is reached. All the paths containing the whole dependence chain, from the instruction that was originally removed until the live-in instruction, are marked as incorrect (PROB$_{misspec}$=1.00).

After computing the new misspeculation probabilities (PROB$_{misspec}$), all the paths containing that edge will be removed from the list of paths and the probabilities of the removed paths will be distributed among the alternative paths with the non-pruned edge.

Definition: Given a branch and one of its edges to be pruned, the pruned paths are those that include the pruned edge. For each pruned path, there exist an alternative path (though the non-pruned edge). An alternative path is defined as the path composed of: (i) the same list of basic blocks in PATH$_{RegSRC}$ from SRC to the pruned branch, (ii) then the non-pruned edge, (iii) then any sequence of basic blocks reaching the TRG, (iv) and finally the same PATH$_{RegTRG}$.

In both cases (edge abortion/pruning in the Opt Region SRC), all the instruction in each basic block in the SET$_{reach}$ (BB) of the pruned branch are unset. Following back the data-dependence graph for those instructions, all the producer instructions are also unset. Thus, the LEN$_{RegSRC}$ of the updated path is recomputed. After the effect in all paths has been updated, the set of variables defined above must be recomputed with the new status.

Each candidate edge is given a value that represents the benefit of aborting or pruning it. This value describes the reduction in length achieved by removing the branch, having into account both the reduction in the optimized Region SRC and the extra misspeculation probability. In order to compute that score will use the following benefit expression:

$$\text{BENEFIT}=\text{PROB}_{correct}\times(\text{LEN}_{total}-\text{LEN}_{reach})+\text{PROB}_{cancel}\times\text{FACTOR}_{cancel}(\text{LEN}_{total}-\text{LEN}_{cancel})$$

As illustrated above, when a branch is pruned the set of paths are updated. The value assigned to the branch is the difference between the current benefit and after the branch pruning. If finally this branch is selected for removal, current benefit will be updated accordingly.

$$\text{SCORE}_{branch}=\text{BENEFIT}_{after}-\text{BENEFIT}_{current}$$

The function FACTOR$_{abort}$(n) represents the benefit of using abort instructions. These allow the detection of a misspeculation in a timely manner. If this function was not present, the early detection would not have any benefit with respect to letting it be incorrect and detect it with a validation mechanism (that would not detect the misspeculation as early as the abort does). No abort instruction would be inserted, and, of course, early detection may be beneficial. How the function is defined depends on the effects that early detection have in the particular context where this mechanism is applied. There has been empirically measured that FACTOR$_{abort}$ can be defined as a linear function:

$$\text{FACTOR}_{abort}(n)=0.35\times n$$

Once all the candidates have been assigned 220 a benefit score, the subset of branches to prune is selected 230. There may be several heuristics to select that set of branches to prune. Finding the optimal solution would require to try all combinations, which is a NP-complete problem. For the experiments used to develop this disclosure, there can be used a greedy algorithm to select the branch that gives the best benefit at each step. After removing this branch, the benefits of the remaining candidates is recomputed 240 and the process is repeated until the benefit of removing every candidate branch left is smaller than the benefit of the current configuration.

Accordingly, the method and apparatus of the inventive subject matter may be used to optimize code in a speculative manner, as long as there is a software or hardware mechanism to validate the correctness of the code. One of its important uses is the optimization of speculative threads. In one example embodiment, the existence of an underlying validation mechanism of speculative threads in an architecture makes the architecture very suitable for this kind of optimization. The parallelization of a program can thus be done more effectively. In addition, speculation can be applied to increment the parallelism at thread level, in a similar way to what was done to instructions with branch prediction. Using speculation, a program may be parallelized by a compiler or code analyzer more easily because it does not need to be conservative and can assume the common case.

According to another example embodiment, the inventive subject matter is applied to speculative multithreading, for as one of the usage models of transactional memory. The branch pruning described herein is a potentially interesting part of the mechanism used in the compiler to optimize the speculative code. In addition, the branch pruning of the inventive subject matter can be applied to any speculative execution model. According to another example embodiment, the subject matter described herein may be applied to helper threads.

Infringement

The mechanism described here can be applied to any compiler, binary analyzer/optimizer, dynamic execution analyzer or virtual machine. Compilers/analyzers/optimizers for any instruction set architecture that generate speculative code (code that will be validated by software or by hardware) are susceptible of using this model to optimize the code.

Figure 3:
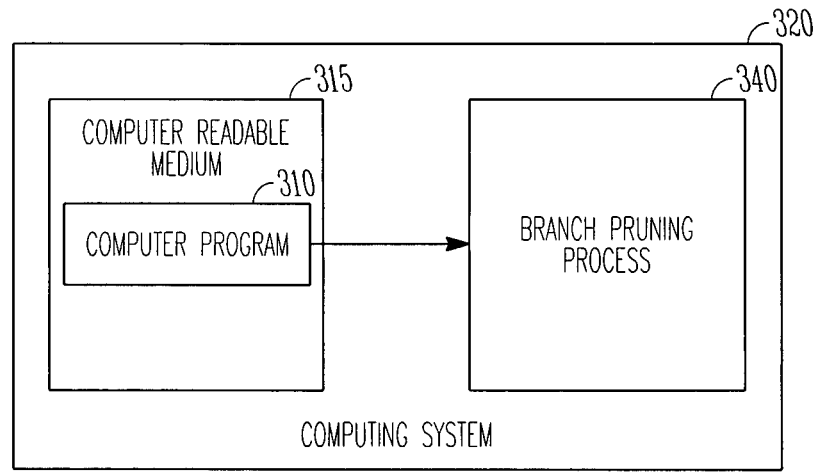
FIG. 3 illustrates an example of an article and system storing and executing a computer program according to an embodiment of the invention.
Figure 4:
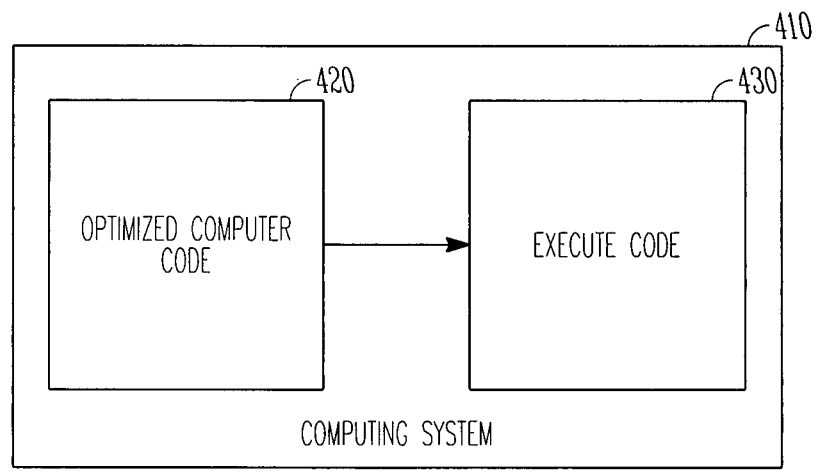
FIG. 4 illustrates an example of a system executing a computer program according to an embodiment of the invention.

According to one example embodiment illustrated in FIG. 3, a computer program 310 embodying any one of the example techniques described above may be launched from a computer-readable medium 315 in a computer-based system 320 to execute a branch pruning process 340 functions defined in the computer program 310. Various programming languages may be employed to create software programs designed to implement and perform the methods disclosed herein. System 320 may be used, therefore, to optimize code using these methods of the inventive subject matter described herein. According to another example embodiment illustrated in FIG. 4, there is provided a processor system 410 which may execute 430 computer code 420 produced by one of the methods or techniques described herein.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which show by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. For example, it may be possible to execute the activities described herein in an order other than the order described. And, various activities described with respect to the methods identified herein can be executed in repetitive, serial, or parallel fashion.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A method comprising:
    identifying, using one or more processors, at least one conditional branch in an original static piece of computer code as a pruning candidate;
    modeling the effectiveness of pruning the pruning candidate from the original static piece of computer code;
    determining whether to prune the pruning candidate based on the effectiveness;
    in response to a determination to prune the pruning candidate, generating a pruned version of the original static piece of computer code by removing at least one instruction associated with the pruning candidate;
    speculatively executing the pruned version; and
    using a mechanism in a computer architecture to determine the effectiveness of a speculative thread;
    wherein the effectiveness is determined based on the length and/or correctness of the pruned version, the correctness being based on a frequency of misspeculation.

2. A method according to claim 1 further including using a hardware or software mechanism to determine the effectiveness of the pruned version.

3. A method according to claim 1 further including scoring two or more branches to assist in identifying at least one conditional branch to prune.

4. A non-transitory computer-readable medium having associated instructions, wherein the instructions, when accessed, result in a machine performing the method of claim 1.

5. A method according to claim 1 wherein identifying the at least one conditional branch includes comparing conditional branches against a bias threshold.

6. A computing system comprising:
    at least one processor; a non-transitory computer-readable medium responsive to the processor; and
    a computer program which, when executed, enables the computing system to perform operations comprising:
    identifying at least one conditional branch in an original static piece of computer code as a pruning candidate;
    modeling the effectiveness of pruning the pruning candidate from the original static piece of computer code;
    determining whether to prune the pruning candidate based on the effectiveness; in response to a determination to prune the pruning candidate, generating a pruned version of the original static piece of computer code by removing at least one instruction associated with the pruning candidate;
    speculatively executing the pruned version; and
    using a mechanism in a computer architecture of the computing system to determine the effectiveness of a speculative thread;
    wherein the effectiveness is determined based on the length and/or correctness of the pruned version, the correctness being based on a frequency of misspeculation.

7. A system according to claim 6 further wherein the processing system includes a hardware or software mechanism to determine the effectiveness of the pruned version.

8. A system according to claim 6 further wherein two or more branches of the original static piece of computer code are scored to assist in identifying at least one conditional branch to prune.

9. At least one non-transitory machine accessible medium comprising computer instructions for pruning computer code, wherein the computer instructions, in response to being executed on a data processing system, enable the data processing system to perform operations comprising:
    identifying at least one conditional branch in an original static piece of computer code as a pruning candidate;
    modeling the effectiveness of pruning the pruning candidate from the original static piece of computer code;
    determining whether to prune the pruning candidate based on the effectiveness;

in response to a determination to prune the pruning candidate, generating a pruned version of the original static piece of computer code by removing at least one instruction associated with the pruning candidate;

speculatively executing the pruned version; and using a mechanism in a computer architecture of the data processing system to determine the effectiveness of a speculative thread;

wherein the effectiveness is determined based on the length and/or correctness of the pruned version, the correctness being based on a frequency of misspeculation.

10. At least one machine accessible medium according to claim 9, wherein the operations further comprise:

using a hardware or software mechanism of the data processing system to determine the effectiveness of the pruned version.

11. At least one machine accessible medium according to claim 9, wherein the operations further comprise:

scoring two or more branches to assist in identifying at least one conditional branch to prune.

12. At least one machine accessible medium according to claim 9, wherein the operation of identifying at least one conditional branch comprises comparing conditional branches against a bias threshold.

13. A data processing system with an ability to prune computer code, the data processing system comprising:

means for identifying at least one conditional branch in an original static piece of computer code as a pruning candidate;

means for modeling the effectiveness of pruning the pruning candidate from the original static piece of computer code;

means for determining whether to prune the pruning candidate based on the effectiveness;

means for generating a pruned version of the original static piece of computer code by removing at least one instruction associated with the pruning candidate, in response to a determination to prune the pruning candidate;

means for speculatively executing the pruned version; and means for using a mechanism in a computer architecture of the data processing system to determine the effectiveness of a speculative thread;

wherein the effectiveness is determined based on the length and/or correctness of the pruned version, the correctness being based on a frequency of misspeculation.

14. A data processing system according to claim 13, further comprising:

means for using a hardware or software mechanism of the data processing system to determine the effectiveness of the pruned version.

15. A data processing system according to claim 13, further comprising:

means for scoring two or more branches to assist in identifying at least one conditional branch to prune.

16. A data processing system according to claim 13, wherein the means for identifying at least one conditional branch comprises means for comparing conditional branches against a bias threshold.

* * * * *